United States Patent [19]

Sorenson et al.

[11] 3,899,633

[45] Aug. 12, 1975

[54] SUBSCRIPTION TELEVISION SYSTEM

[75] Inventors: Keith S. Sorenson, Diamond Bar; David E. Lewis, Orange, both of Calif.

[73] Assignee: Columbia Pictures Industries, Inc., New York, N.Y.

[22] Filed: May 12, 1972

[21] Appl. No.: 252,670

[52] U.S. Cl. ............. 178/5.1; 178/DIG. 13; 325/31

[51] Int. Cl. ............................................. H04n 1/44

[58] Field of Search ......... 325/31; 178/5.1, DIG. 13

[56] References Cited

UNITED STATES PATENTS

| | | | |
|---|---|---|---|
| 3,078,337 | 2/1963 | Shanahan et al. | 178/5.1 |
| 3,188,384 | 6/1965 | Townsend | 178/5.1 |
| 3,230,302 | 1/1966 | Bruck et al. | 178/5.1 |
| 3,387,083 | 6/1968 | Farber et al. | 178/5.1 |
| 3,676,580 | 7/1972 | Beck | 178/5.1 |
| 3,684,823 | 8/1972 | McVoy | 178/5.1 |
| 3,733,430 | 5/1973 | Thompson et al. | 178/5.1 |
| 3,790,700 | 2/1974 | Callais et al. | 178/5.1 |

*Primary Examiner*—Richard A. Farley
*Assistant Examiner*—S. C. Buczinski
*Attorney, Agent, or Firm*—Kenyon & Kenyon Reilly Carr & Chapin

[57] ABSTRACT

A subscription television system, in which secure television signals modulated on carriers not directly receivable by a standard television set are impressed upon a master cable system extending to subscriber stations having converter means to receive selected secure channels. Each subscriber station possesses means to selectively enable or disable reception of any or all of the secure signals in response to a command from a central station remote from the subscriber stations. Selective addressing of individual subscriber stations is achieved by actuating the desired subscriber stations by means of a coded sequence of tone signals of discrete frequencies. Each subscriber station is provided with frequency logic gating, the gating for each subscriber station being responsive only to a unique coded sequence of tones to enable the receipt of a command from the central station. The same frequency coded tones which are used to address the subscriber station are also used to command which of the secure channels are to be enabled. This function is performed by varying the duration and time pattern of the coded tones within the original coded sequence which is used to address the subscriber station. The mode of enablement can, among other possibilities, be the generation at the subscriber station of a noise signal, which noise signal is selectively applied to the secured channel signals whenever the subscriber station is set to receive a secure channel whose reception has not been enabled.

10 Claims, 12 Drawing Figures

TIMING DIAGRAM

PATENTED AUG 12 1975 3,899,633

SHEET 4

SUBSCRIPTION TELEVISION SYSTEM

BACKGROUND OF THE INVENTION

1. Field of the Invention

This invention relates to the field of subscription television systems having means for enabling reception of selected secure channels at selected subscriber stations in response to commands emanating from a position remote from the subscriber stations.

2. Description of the Prior Art

It is known to provide subscription television systems in which television signals are impressed on a master cable extending from a central station to various subscriber stations. In some of these prior systems, all the signals on the cable are freely available to each subscriber station by means of the viewer setting a selector on a program selector unit. The central system sequentially signals each individual program selector at each subscriber station. In response to these interrogating signals, each interrogated subscriber station responds with an answer signal which is transmitted via the master cable system to the central station. The quality of this signal indicates which of the available channels the interrogated program selector is tuned to. The answer signal is transmitted back to the central station of the system via the master cable system, where it can be recorded for billing purposes.

Such systems have a disadvantage in that they possess no positive control means whereby the signals receivable at any subscriber station can be determined from the remote central station. All the signals are freely available at each subscriber station, and the only capability of the system is to register which of the signals is being viewed at each subscriber station when the station is interrogated electrically. This may create a problem in that some subscribers may have credit problems which might cause the subscription operators to limit the purchasing volume of some of the system subscribers. Also, in systems serving locations such as hotels, where most of the subscribers are transients, and collection of charges may sometimes prove difficult, it may be particularly desirable to maintain an affirmative control over the reception of secure signals by the various subscriber stations. The prior art systems discussed heretofore, such as that described in Shanahan U.S. Pat. No. 3,078,337, needless to say, do not provide this kind of positive control.

Some known systems exist which do enable positive control over the signals received at the subscriber stations. Such a system is shown in U.S. Pat. No. 3,033,922 to Campbell. In this type of system, the individual subscriber station is addressed by means of a step switch, followed by a sequence of pulses after the addressed subscriber station is actuated to respond to such pulses. Such a system is not always suitable for a large subscription system, inasmuch as it takes a significant amount of time to issue commands to each of the subscriber stations. Addressing and enablement in these prior art systems must take place separately, and code address-command sequence requires an excessive length of time.

SUMMARY OF THE INVENTION

The subscription television system of this invention includes a central command station, and a number of subscriber stations, each of which includes a conventional television set and a room converter having its output connected to the input of the television set. A master cable system connects the central station with each of the subscriber stations, via the input to each of the subscriber stations room converters.

A number of signals are impressed on the master cable system, by way of a mixer at the central station whose output is connected to the input of the master cable system. Applied to the input of the mixer are conventional television signals which are received by means of a master antenna serving the group of subscriber stations connected to the master cable system. Also input to the mixer are television signals modulated on carriers not receivable directly by a conventional television set. These carriers may lie in the sub-band range relative to the conventional broadcast television spectrum, or they may lie in the mid-band between the high and low bands of the conventional signals.

Means is also provided to impress on the mixer input certain command signals which may be generated at the central station. The command signals comprise a sequence of several tone signals, each tone signal having its own discrete frequency. It can thus be seen that the input of each room converter is provided with conventional television signals, secure channel signals, and command signals which may occasionally issue from the central station.

Each room converter is provided with a selector switch, having positions for receiving each of the secure channels, and for receiving the standard broadcast television signals received from the master antenna, this latter position being designated "standard". The room converter is also provided with a local oscillator capable of generating a noise signal to render unintelligible any television signal with which the noise signal is mixed. It is by control of the noise generator and of the routing of the various signals input to the room converter that the various signals input to the room converter may be rendered selectively receivable. The room converter also possesses a converter element which is capable of rendering receivable any of the secure channels.

The conventional signals received by way of the master antenna are bypassed around both the local noise oscillator and the converter apparatus, and directly input to the television set. This renders all of the conventional signals freely receivable, when the subscriber turns the room converter to the standard position.

When the room converter selector is positioned to receive one of the secure channels, the signal for that channel is converted to a locally unused standard TV channel. Under normal circumstances, the noise oscillator is operable wherever one of the secured channels is selected on the room converter selector dial. This means that, although the signal is converted to a frequency receivable by the television set, the noise added by the local oscillator renders the signal unreceivable.

Selected ones of the secured channel signals are rendered receivable by causing the deactuation of the noise oscillator whenever the room selector dial is tuned to receive one of the secure channels which is desired to be enabled. This selective enablement is accomplished by means of the tone control signals directed to the subscriber stations from the central station. The enablement process includes addressing the particular room converter whose enablement is desired, and providing additional information to which the room converter responds to enable only the desired selected secure channel.

The address signals include an overlapping sequence of tone signals each having its own discrete frequency. Each room converter is addressed and becomes actuated for selective enablement, only upon receipt of a precise unique sequence of tone signals. The address sequence for each room converter is unique.

The same coded tones which are used to address and actuate each room converter to receive commands are also used to convey the command determining which of the secure channels are to be enabled. This is done by varying, in a coded fashion, the duration and time pattern of the coded signals of the sequence. Thus, the sequence of coded frequency tones serves the double purpose of addressing the desired room converter, and also commanding the room converter as to which of the secure signals are to be enabled.

In a preferred embodiment of the invention, it is also desired to make one of the secure channels an "information" channel, which may bear such information as general news, weather, or other service programs, in addition to possibly previewing the offerings on the other secure channels. In this scheme, the information secure channel is desired to be provided free to any subscriber who wishes to view it. This is done by providing that the noise oscillator be disabled whenever the control on the room converter is tuned to the information channel.

It is thus an object of the invention to provide a subscription television system in which reception of the secure channels can be positively enabled or prohibited in response to commands from a central station.

It is a further purpose of this invention to provide a subscription television system in which the commands addressing various selected subscriber stations, and the commands directed to the addressed stations to enable or prohibit reception of secured channels may be constituted by the same set of coded frequency tones. This system simplifies the apparatus, and compresses the time needed to address and command each subscriber station. This can be significant when the subscription television system includes a large number of subscriber stations.

DESCRIPTION OF THE PREFERRED EMBODIMENT

Figure 1:
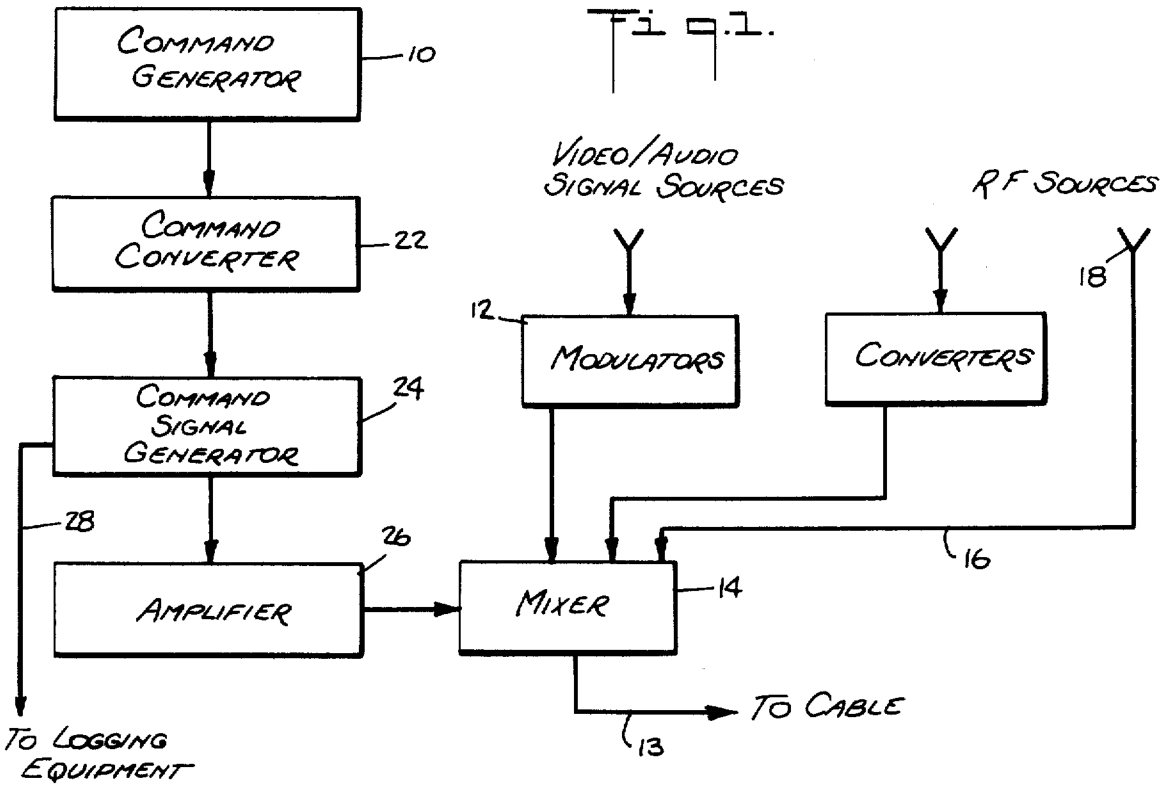
FIG. 1 is a block diagram of the portion of the central station apparatus concerned with generation of the command signals and the input of the signals to be viewed to the cable system.
Figure 2:
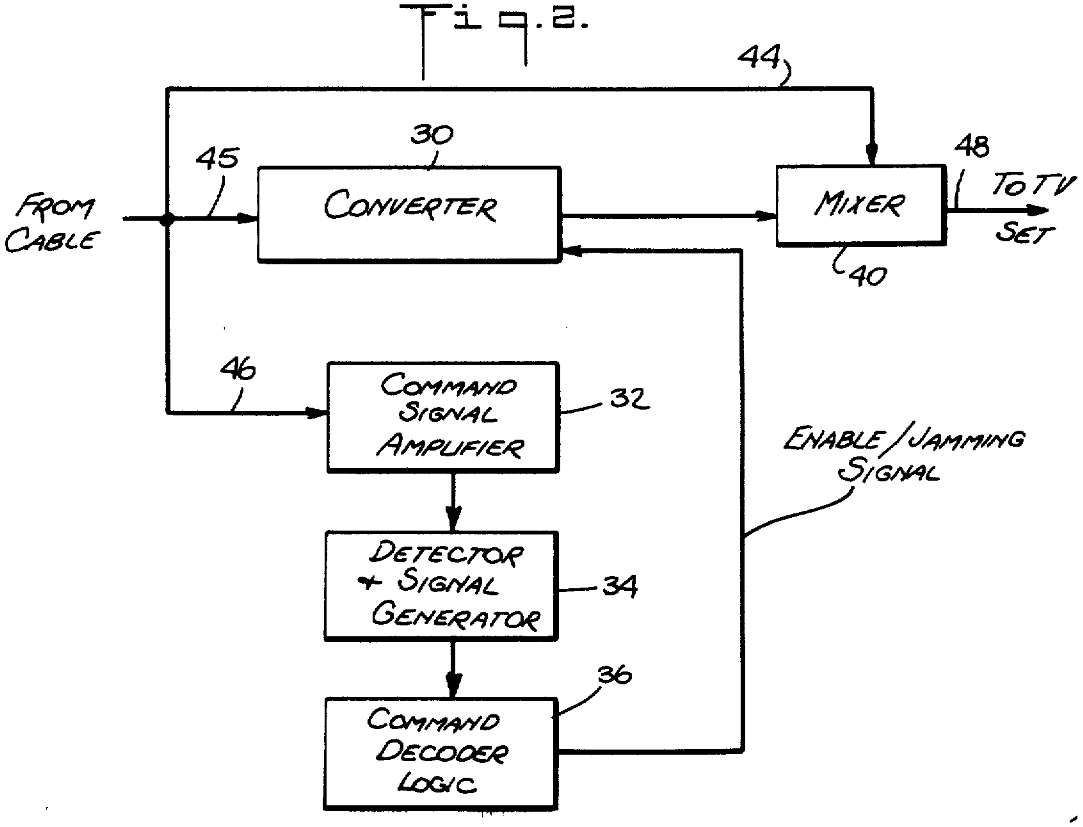
FIG. 2 is a block diagram illustrating elements of the room converter of this invention involving reception of the command and other signals and their input to the television set.

Block diagrams showing the basic apparatus of this invention are set forth in FIGS. 1 and 2. FIG. 1 shows the apparatus used for impressing special secure television signals, along with conventionally received signals, onto a master cable distribution system. Provision is also made for impressing upon the cable distribution system command signals within the pass band of the cable system which are applied to all the room converters, but are recognizable by only the desired addressed room converter.

Referring first to FIG. 1, it is noted that modulators 12 are provided to receive one or more video/audio signals. Modulators 12 modulate these signals onto discrete carriers lying within a frequency range which is within the pass band of cable distribution system 13, but outside the frequency spectrum of conventional VHF television. Applicants have found that a suitable range for such carriers lies between 25 and 50 MHz. These signals from modulator 12 are the secure channels, the authorization of reception of which it is desired to control by means of the subscription television system of the present invention. They may be internally generated, kinescopes, special events or any of a number of other special television signals the viewing of which is desired to be sold or monitored.

The secure channel signals from modulators 12 are directed to a mixer 14, from which they pass into cable distribution system 13. Cable distribution system 13 extends to each of the subscriber stations in the system, the particular characteristics of which are fully discussed below. Also, input to mixer 14 is the output 16 of antenna 18. Antenna 18 is simply the master television antenna which serves the community of subscriber stations within the subscription television system. Thus, the conventionally available local TV signals are also impressed upon the cable distribution system.

Other RF sources can be added to the collection of signals impressed upon the cable distribution system by means of converter 20, whose output is also directed to the mixer 14.

Provision is also made for impressing on the cable system by way of mixer 14 address-command signals to address particular subscriber stations and to command the addressed stations to enable reception of selected ones of the secure channels. Command signals are generated by command generator 10. The command signals are in the range between 500 and 1200 KHz. The address-command signals are emitted in groups of four in an overlapping time sequence. Command converter 22 receives the address-command signals and modulates them on a carrier preferably lying in the range of 34 and 35.2 MHz. Command signal generator 24 then applies the command signals to amplifier 26, whence they are directed to mixer 14. The address-command signals also may be directed from command signal generator 24 by means of line 28 to loging equipment for recording the issuance of the various command signals. Such loging equipment is discussed hereinbelow.

The basic system element in this subscription television system is the room converter which is used cooperatively with the subscriber's conventional television receiver. This room converter, depicted in block form in FIG. 2 selectively converts each 6 MHz wide audio/video secure channel to a common 6 MHz wide channel in the standard television VHF band. Typically, the channel to which the converter will convert these signals is a locally unused VHF channel. Often, channel 6 is a suitable choice.

Converter 30 of the room converter unit is provided with a tuning selector 50 (See FIG. 3) having one selector position for each of the secure channels and one position for receiving the conventionally received local channels. The converter setting for viewing the conventional channels is designated standard.

Under this arrangement, all secure programs which are present on the cable system, which are outside the VHF band may be viewed, with the assistance of the room converter, on the television set tuned to channel 6 and the converter set to the desired secure channel. All the conventional television channels received by way of the master antenna may be viewed by setting the room converter to the standard position and tuning the television set to the respective desired standard channels.

As shown in FIG. 2, the secure channels and the standard channels, along with any control signal which may be present, are delivered by way of cable distribution system 13 to the input of converter 30. When the selector of converter 30 is tuned to the standard position, the signals present on cable distribution system 13 are caused to bypass converter 30 altogether, being input to mixer 40 by way of line 44. Since the output signals from mixer 40 pass directly to the input of the television set through line 48, it becomes clear that, when converter 30 is set to the standard position, all the conventional TV signals passing to mixer 40, being of frequencies detectable by the conventional television set, can be freely viewed by the subscriber.

When the selector of converter 30 is tuned to one of the secure channels, these signals are then passed via line 45 through converter 30 and onto mixer 40. Converter 30 is characterized in that it is adjusted by means of the selector switch to convert to the appointed standard television channel the signal of that secure channel to which converter 30 is tuned.

Converter 30 also contains means to prevent unauthorized viewing of secure channels. This means includes an internal noise oscillator which mixes a noise or jamming signal with the secure channel signals as they are converted. The presence of the noise on the secure channel signals renders them unreceivable.

The room converter also incorporates means to carry out remotely issued address-command orders to enable selected ones of the secure channels for viewing. As was sent out above, the address-command signals are impressed upon cable distribution system 13. The address-command signals are input by way of line 46 to converter signal amplifier 32. From there, the command signals go to detector and signal generator 34, and to the command decoding logic 36.

When an address-command signal, which, as noted above, comprises a series of four time sequenced overlapping signals each having a discrete frequency, is sent out from the command generator 10, it is distributed by cable system 13 to all of the room converters in the system. The address-command signal, however, is recognizable by only the one of the room converters to which the signal is addressed. The address borne by the coded frequency signals comprises the four discrete frequencies present and their timed sequence. The command detector logic circuitry 36 of each room converter is programmed to recognize and respond to only one coded address sequence. Thus, when an individual room converter receives a coded sequence not bearing its address, receipt of this signal has no effect on that particular room converter. If, on the other hand, the signal received by the room converter bears its own address, then that room converter is actuated to respond thereto.

The coded sequence of tones having discrete frequencies also bears command information to the room converter to which it is addressed. This command information indicates which of the secure channels are to be enabled for viewing at the room converter receiving the particular address-command signal.

The command is executed at the room converter by actuating converter 30 to disable the noise oscillator whenever the selector at converter 30 is tuned to that secure channel whose viewing is authorized. Thus, if secure channels A and B are available for viewing, the receipt of an address-command signal at the room converter bearing information commanding the enablement of channel A sets up the converter 30 such that the oscillator is disabled whenever the selector switch on converter 30 is turned to channel A. In a similar manner, any of the other secure channels, or all of them, can be enabled in response to the command signal carried by the sequence of coded frequency tones.

Figure 3:
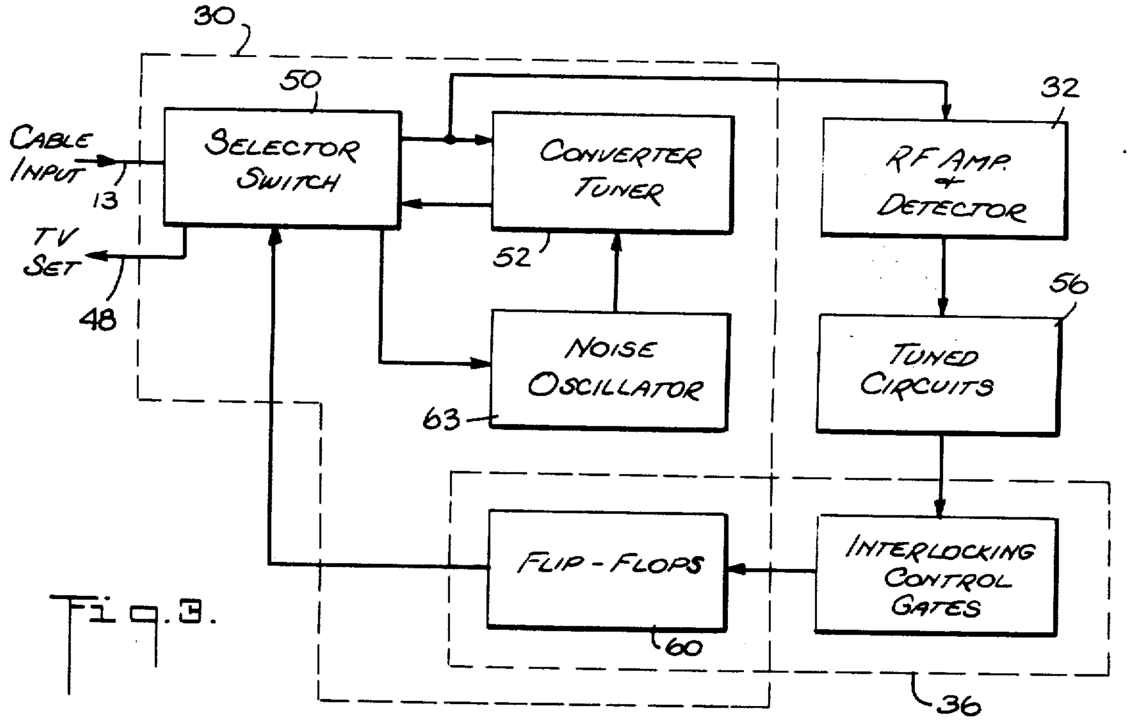
FIG. 3 is a block diagram of the room converter of this invention, showing more specifically the apparatus for selectively enabling and disabling the reception of various television signals input to the room converter.

Referring to FIG. 3, there is shown therein a block diagram indicating more specifically the components of converter 30 as discussed in connection with FIG. 2. All the secure channel signals on cable distribution system 13 are input to selector switch 50, from whence they are directed to converter-tuner 52. Noise oscillator 63, controlled in a fashion discussed hereinbelow, is connected with its output directed to converter 52. With oscillator 63 in a disabled condition, any secure channel signal entering converter-tuner 52, and to which converter-tuner 52 is tuned, is simply converted to the appropriate frequency for reception on a standard television set, and fed back through the selector switch through output line 48 to the television set.

It should be made explicit that selector switch 50 serves several functions. First, it controls a switch which causes the conventional TV signals to bypass the converter whenever the selector switch is in the standard position. Second, the selector switch is ganged with the tuner portion of the converter-tuner such that, when the selector switch is tuned to a secure channel, the converter converts to the desired locally unused channel only that secure channel to which the selector switch is tuned.

Thirdly, an output of selector switch 50 is also connected to noise oscillator 63. The effect of this output from selector switch 50 is to render the noise oscillator operable in all cases in which the selector switch is tuned to a secure channel. This prevents any unauthorized reception of the secure channel by rendering unintelligible any secure channel which is selected at the selector switch.

Means is also shown for actuating the selector switch to disable the oscillator when the selector switch is tuned to a secure channel which is authorized. The output signal passing through the selector switch 50 is also transmitted to the RF amplifier and detector 32, which demodulates and amplifies any address-command signal which may be present on the incoming signal from cable distribution system 13.

After detection and amplification, the address-command signal is directed to a battery of tuned circuits 56. Tuned circuits 56 are equal in number to the number of coded tones comprising each address-command signal. Each of tuned circuits 56 is responsive to only one frequency among the discrete frequencies which may appear among the coded tones comprising the address-command signal. The tuned circuits operate by changing a voltage level output therefrom when excited by their characteristic frequency. The outputs, if any, from the tuned circuits (if no frequency to which any of the tuned circuits is responsive is present in the address-command signal, there will be no outputs) is directed to the interlocking control gates 58. Interlocking control gates 58 are arranged such that they produce an ultimate output only if their associated room converter is the one addressed by the command signal. This means that the control gates 58 will not produce any output unless the four coded tone signals of the address-command signal received correspond in frequency to the frequencies of excitation of all of the tuned circuits 56. It is also required, for an output, that the receipt of the four tones be in one specified sequential order.

As was stated above, the sequence of coded tones comprising the address signal also carries command information which instructs the addressed room converter unit to permit viewing of any or all of the secure channels. The command information is borne by a second type of coding within the overlapping time sequence of the four coded tones. The duration of the coded tones may be altered in a way which is detectable by the flip-flops 60 to which the output of the interlocking control gates 58 are fed. Alternately, some of the control tones may be repeated at a later time during the sequence, and this information can be utilized to actuate the flip-flops to execute the command at the addressed room converter.

Flip-flops 60 are designed to receive and respond to the command information and have their outputs connected to noise oscillators 62, in a manner determined by the position of selector switch 50. The flip-flops can control the noise oscillator such that the noise oscillator becomes disabled when the selector switch is tuned to the one or more of the secure channels whose reception is desired to be received, the authorization having taken place by actuation of a flip-flop 60.

A great many addresses may be carried by a combination of four coded tones, such as are utilized in this preferred embodiment. Applicants comprehend using four tones for each address, the frequencies of the tones being selected from among ten frequencies. The number of combinations possible when selecting four different frequencies out of 10 available frequencies is 210. The number of addresses is further increased when one considers that applicants also incorporate into the address the precise ordering of the four frequencies. The number of possible orders of four frequencies (with respect to time and position within a sequence) is 24. Therefore, the total number of addresses which are possible by the use of four coded frequency tones, the frequencies of which are selected from ten frequencies, considering that the order is also a part of the address, is 24 times 210 or 5040 uniquely available addresses. It has been mentioned hereinabove that the preferably range for the carrier of the secure channel signals lie in the rage of 25–50 MHz. More particularly, applicants have determined that the following specific carrier frequencies are optimum:

| Channel | Video | Audio |
|---|---|---|
| Information (C) | 48.25 MHz | 42.25 MHz |
| (A) | 41.00 MHz | 36.50 MHz |
| (B) | 30.00 MHz | 25.50 MHz |

Figure 5:
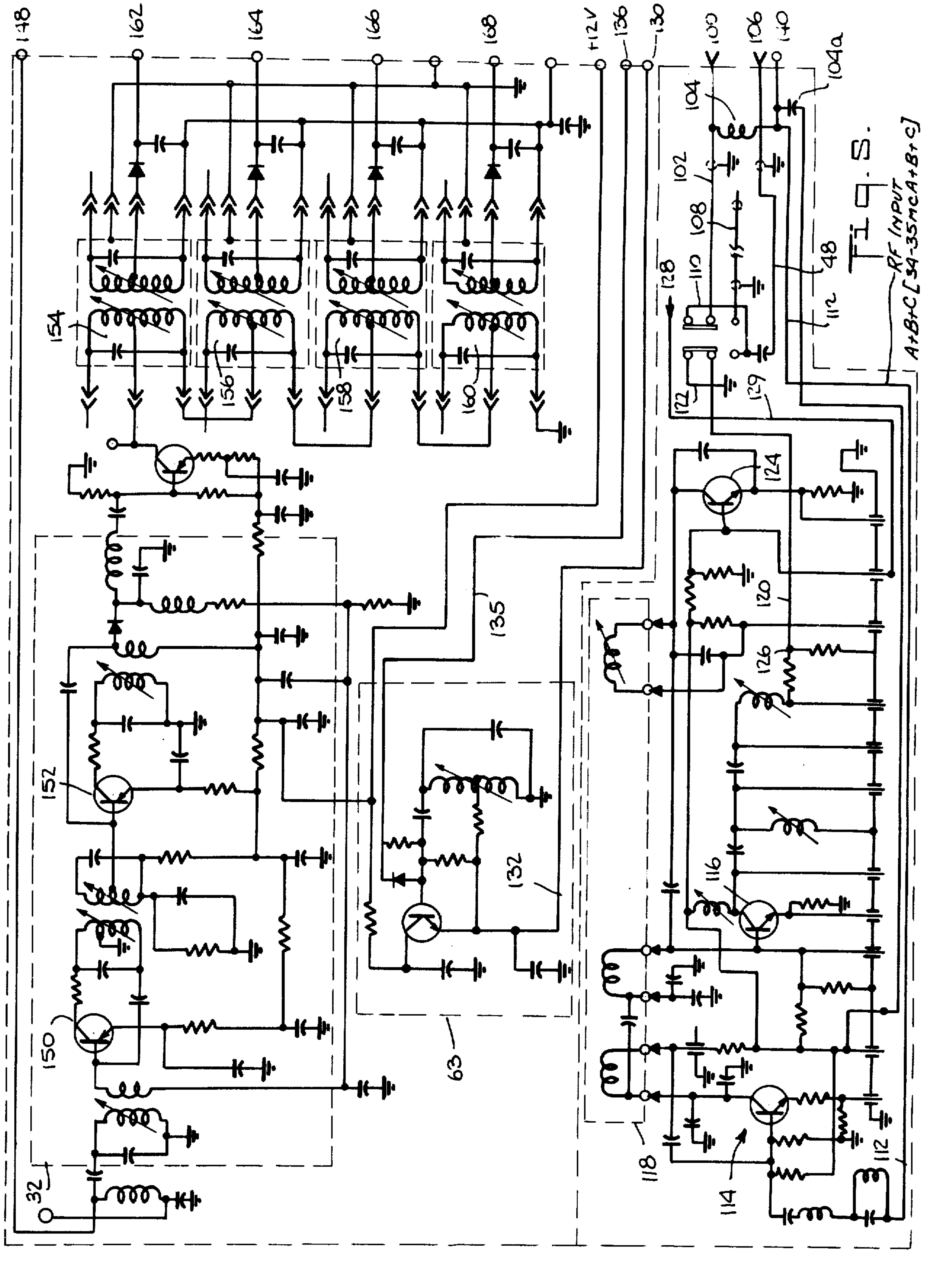
FIG. 5 is an electrical schematic diagram showing the specific circuitry in the input portion of the room converter of this invention.
Figure 6:
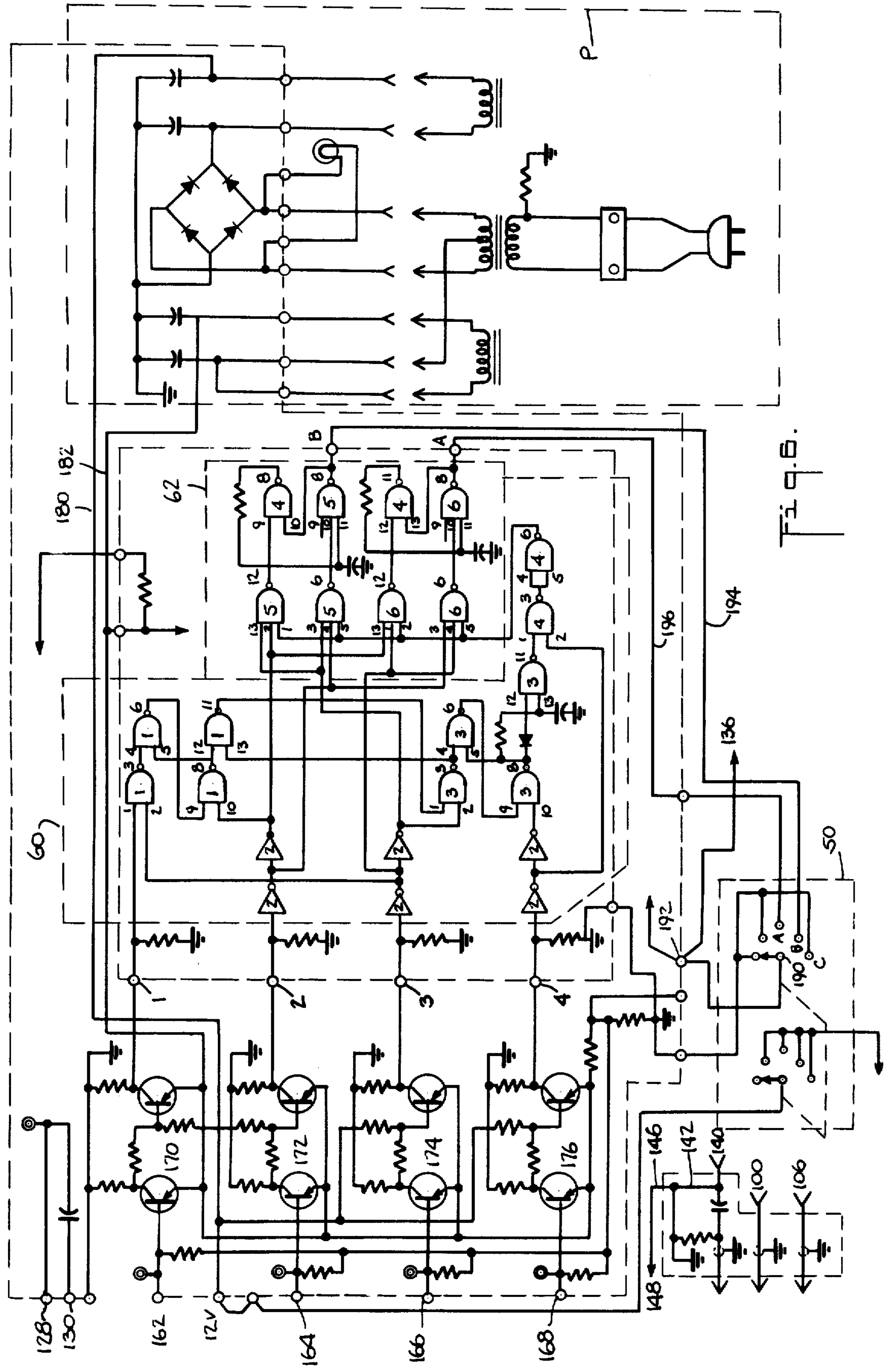
FIG. 6 is an electrical schematic diagram showing additional specific circuitry, including the logic control circuitry, of the room converter of this invention.

The specific circuitry for the room converter components of the system of this invention is shown in FIGS. 5 and 6. FIGS. 5 and 6 should be considered simultaneously, there being considerable cross-reference between the two. Considering FIG. 6, terminal 100, in the lower left hand corner represents the terminal 100 at which the signals from cable distribution system 13 enter the room converter. Terminal 100 is also represented in the lower right corner of FIG. 5. Referring further to FIG. 5, the conventional television signals on the master antenna proceed along lead 102 to switch 110. Trap 104 separates out the signals comprising the secure channel signals and any command signals which may be present at terminal 100, and directs these signals onto lead 112.

Switch 110 is ganged to the control knob of selector switch 50, illustrated in the lower left portion of FIG. 6, such that it is in the upper position, as shown, when selector switch 50 is turned to the standard position. In that position, it can be seen that the conventional TV signals pass through leads 110 and 48 to terminal 106, which is directed to the input to the subscriber's television set. Thus, when selector switch 50 is turned to the standard position, the conventional television signals proceed directly to bypass the other elements of the room converter and go directly into the television set, in which they can be directly received in the conventional fashion.

The signals on lead 112, which include the secure channel signals and any command signals which may be present, are directed to the input of the tuner-converter. The tuner-converter includes the amplifier stage indicated generally as 114, a turret tuner 118, a converter circuit associated with the transistor 124, and a further amplifier stage associated with transistor 116. The converter circuitry and turret tuner 118 cooperate to convert to either channel 5 or channel 6 one of the secure channel signals. The one of the secure channel signals which is converted depends on the setting of turret tuner 118. Turret tuner 118 is also ganged to selector switch 50, such that the tuner and converter circuit converts to channel 5 or 6 whichever secure channel is dialed by means of the selector dial on selector switch 50. The converted output appears at terminal 126, and is directed by way of lead 120 to switch 110. It can be seen that, when switch 110 is in its uppermost setting, corresponding to the standard setting on selector switch 50, any converted output appearing at terminal 126 is grounded by way of lead 122, and does not interfere in any way with reception of the standard signals.

Switch 110 is linked to selector switch 50 in such a way that, when selector switch 50 is dialed to select any of the secure channels for reception, switch 110 moves to its downward position. In that position, any converted output appearing on lead 120 will, instead of being grounded, be directly immediately onto lead 48, from which it is input to the television set which may receive it when set on either channel 5 or 6, depending on which channel the secure channel is converted to.

Provision is made for jamming selectively the output of the converter-tuner circuitry, which output appears at terminal 126. This is accomplished by selectively inducing an output at either or both of terminals B or A of the flip-flops designated on FIG. 6 within box 62. These outputs are applied to actuate a jamming oscillator indicated in box 63 of FIG. 5. The determination regarding which of the outputs B and A carry a jamming signal is made by way of the logic circuitry indicated within box 60 of FIG. 6 which cooperates in response to the coded tone address-command signals which are sent from the command generator to the room converter. The precise operation of the circuit configurations is discussed hereinbelow.

For the present, however, it is sufficient to note that the output from terminal B is directed along lead 194 to terminal B at the selector switch 50. The output from terminal A is directed along lead 196 to terminal A on selector switch 50. The presence of a signal on one of the terminals A or B, in conjunction with the operation of selector switch 50, actuates jamming oscillator 63 to prevent viewing of that secure channel which is converted at point 126 when selector switch 50 is dialed to one of terminals A or B having a signal thereon. For example, it is necessary, in order to view channel A, to turn selector switch A to dispose its wiper 190 on terminal A. This is so because, as noted above, the wiper of selector switch 50 is ganged to turret tuner 118 such that, when the selector is turned to terminal A, the converter converts to channel 5 or 6 only that secure channel signal which corresponds to channel A.

This controlled interference, or jamming, happens in the following fashion: Assuming there is a signal present at terminal A, whenever the wiper 190 is turned to terminal A, that signal proceeds to terminal 192 and hence to terminal 136. Referring back to FIG. 5, the signal proceeds from terminal 136 along lead 135 to actuate jamming oscillator 63. The output from jamming oscillator 63 proceeds along lead 132 to terminal 130. Referring to FIG. 6, this signal then progresses to terminal 128, and, going back to FIG. 5, enters FIG. 5 at terminal 128 and proceeds along line 129 to the base of the converter transistor 124. The effect of the presence of the output of the jamming oscillator on transistor 124 is to cause an amplitude modulation of the signal which is being converted by the converter, such that its output is turned off and on rapidly. This condition renders the converted signal unintelligible to the TV set.

Therefore, it can be seen, that, when the output of the flip-flop on terminal A is a positive voltage, the jamming oscillator 63 will jam out channel A whenever the subscriber attempts to dial channel A on selector switch 50. If there is no signal on channel B terminal, there will be no actuation of the jamming oscillator when the subscriber tunes to channel B on selector switch 50, and channel B is thus in an enabled state. Channel C, corresponding to the terminal designated by that letter, is always enabled, and consequently does not have a flip-flop output connected to it. Channel C is the information channel which as discussed above is desired to be provided free to all subscribers at all times.

Having described the operation of the jamming circuitry, there remains to be described the disposition of command signals which may from time to time enter the room converter by way of terminal 100. As described above, trap 104 removes from lead 102 the signals corresponding to the command signals and the secure channels. These signals were then applied to lead 112. The same signals, however, are also applied to terminal 140 in the lower right portion of FIG. 5. Referring to FIG. 6, lower left, the command and secure channel signals proceed from terminal 140 through a filter and thence along leads 142 and 146 to terminal 148. Referring back to FIG. 5, upper right, the command signals (the secure channel signals having been filtered off) then proceed to RF amplifier stages 150 and 152. From there, these signals are then passed through a series filter indicated generally by elements 154, 156, 158 and 160.

At this point, the command signals, which have been detected off their carriers, are presented to the series filters. Each element in the series filter is characterized in that it will deliver an output to its corresponding terminal 162, 164, 166, and 168, respectively, when the coded tone signals present among the command signals correspond to a characteristic frequency. Each series filter element is designed to respond to a different one of 10 possible control frequencies which may be transmitted by the command generator.

It can thus be seen that, when one of the control tone frequencies corresponding to the characteristic response frequency of one of the elements of the series filter is transmitted to the room converter, the series filter element corresponding to that frequency will deliver an output at its respective output terminal 162, 164, 166 and 168. Referring to FIG. 6, there is shown terminals 162, 164, 166 and 168 connected respectively to the inputs of flip-flops 170, 172, 174 and 176.

Each of these flip-flops is characterized in that when an input appears at its respective input terminal, it generates a fixed voltage output at its output terminal. The output terminals of the flip-flops 170, 172, 174 and 176 are terminals 1, 2, 3 and 4, respectively.

Terminals 1, 2, 3 and 4 constitute the input terminals of the logic circuitry designated generally on FIG. 6 as box 60, to which flip-flops 62 respond in a programmed fashion to determine the outputs of terminals B and A in accordance with the sequence of control tones received by the room converter.

Referring to FIG. 6, there is illustrated therein generally within boxes 60 and 62, the specific logic circuitry employed in connection with the system of this invention. There are two basic types of logical gates employed in this system. The logical elements designated by triangles and numbered with the chip number 2 are simply inverters. All the other logical gates symbolically illustrated are of the NAND type. The output of the NAND gate comes true only when all of its inputs are false. In terms of binary concepts, this means that the output of the NAND gate is 1 only when all of its inputs are 0. Conversely, the output of the NAND gate can be made false by merely placing a true signal on any of its inputs.

As pointed out in the preceeding discussion, terminals 1, 2, 3 and 4 represent the outputs of the four tuned circuits 58. These tuned circuits, it will be remembered, each respond to one of the 10 control tone frequencies which constitute the address-command signals transmitted from the central station. The sequence of outputs 1, 2, 3 and 4 from the four tuned circuits is applied to the inputs to the logic circuitry and flip-flop circuitry 60 and 62 illustrated in FIG. 6. The two flip-flops 62 for each room converter are unlocked for potential command acceptance by the addressing of the room converter by its receipt of its particular address sequence. Additionally, the sequence of control tones which constitute the address for the room converter also contains information, encoded by way of altering the duration and sometimes repeating the outputs at terminals 2, 3 and 4. This additional coded information constitutes the command, which causes one or the other flip-flop 62 to change state. The change in state of these flip-flops governs the presence or absence of an output at each of terminals A and B. As further discussed above, an output at terminal A will cause the jamming oscillator to be actuated to render unintelligible the picture on channel A whenever the wiper of selector switch 50 is moved to the A position. Conversely, when an output is present at the B terminal, the jamming oscillator is actuated only when the selector switch is tuned to position B. The presence of outputs on both terminals A, B has a cumulative effect, of course, blocking both channels.

In elaborating upon the explanation of the operation of the logic circuitry shown in FIG. 6, a particular notation will be used to identify the various terminal points among the logic circuit elements. Each terminal point among the logic circuit elements is identified by the form *x* - *y*. *x* is used to indicate the chip number of the logical element whose specific input or output terminal is to be identified, while *y* indicates the specific numbered terminal within the series of chips bearing chip number *x*. It is noted that the same chip number has been assigned to pluralities of logical elements in many instances. This does not create ambiguity in identifying any terminal, however, because no input or output terminal number within any series of chips bearing the same chip number *x* has been duplicated. Thus, terminal "4-6" indicates the output of the logical NAND gate bearing the chip number 4 in the lower right hand corner of box 60. A single digit number 1, 2, 3 or 4, by contrast, refers to the output of one of the four tuned circuits discussed hereinabove.

It can be seen that, for any flip-flop to be able to change state, it is necessary that 4-6 be true. The following set of statements are presented to demonstrate that 4-6 cannot come true except if the output 1, 2, 3 and 4 are made true in sequence.

1. 4 - 6 must be true for any output flip flop to change state.
2. 4 - 6 will go true (+4 volts) when 3 - 8 is true and the input 4 has been true for 0.5 ms and then goes false.
3. 3 - 8 will never go true unless 3 - 6 and 4 is true.
4. 3 - 6 will never go true unless 1 - 11 and 3 is true.
5. 1 - 11 will never go true unless 1 - 6 and 2 is true.
6. 1 - 6 will never go true unless 1 is true and 3 is false.

Note the rules above results in a combination lock type sequence which is only satisfied if input 1 - 2 - 3 - and 4 are turned on (made true) in sequence and then input 4 is turned off to force 4 - 6 true.

With 4 - 6 turned on (true), it now becomes possible depending on the condition of the inputs from the tuned circuits 2 and 3 when 4 - 6 reverts from true to false, to command the flip-flops to modify the outputs on output terminals A, B. There are four separate commands necessary to achieve all possible permutations and combinations of the true-false status of terminals A and B. They are: turning B on, turning B off, turning A on and turning A off.

Applicant discloses herewith the following analyses of the logic circuitry shown in FIG. 6 in order to arrive at particular combinations of inputs 2 and 3 of the tuned circuits in order to cause the flip-flops to execute the above commands. They are considered one-by-one as follows:

B ON $5 - 13 \cdot 5 - 1 \cdot 5 - 2 = \overline{5 - 12} = \overline{4 - 9}$

4 - 9 sets 5 - 8 (B) false and clears channel B $5 - 13 = 3$ $5 - 1 = 2$ $5 - 2 = 4 - 6$ Therefore $3 \cdot 2 \cdot 4 - 6 =$ B ON

B OFF $5 - 3 \cdot 5 - 4 \cdot 5 - 5 = \overline{5 - 6} = \overline{5 - 10}$

5 - 10 Sets 5 - 8 (B) true and jams Channel B $5 - 3 = 3$ $5 - 4 = \overline{2}$ $5 - 5 = 4 - 6$ Therefore $3 \cdot \overline{2} \cdot 4 - 6 =$ B OFF

A ON $6 - 13 \cdot 6 - 1 \cdot 6 - 2 = \overline{6 - 12} = \overline{4 - 12}$

4 - 12 Sets $\overline{6 - 8}$ (A) false and clears Channel A $6 - 13 = 2$ $6 - 1 = \overline{3}$ $6 - 2 = 4 - 6$ Therefore $2 \cdot \overline{3} \cdot 4 - 6 =$ A ON

A OFF $6 - 3 \cdot 6 - 4 \cdot 6 - 5 = \overline{6 - 6} = \overline{6 - 10}$

6 - 10 Sets 6 - 8 (A) true and jams Channel A $6 - 3 = \overline{2}$ $6 - 4 = \overline{3}$ $6 - 5 = 4 - 6$ Therefore $\overline{2} \cdot \overline{3} \cdot 4 - 6 =$ A OFF On examination of the four equations derived above (B ON — B OFF — A ON and A OFF) the requirements for the state of the outputs 2 and 3 of the four tuned circuits becomes clear. For example, to turn B ON, it is necessary that both 2 and 3 outputs of the tuned circuits be true and that 4 - 6 be true. To make 4 - 6 true, note from the above that one of the conditions is that output 4 from the tuned circuits has been true for 0.5 milliseconds (ms) and then goes false. This is equivalent to saying that the "B ON" command is effected when both outputs 2 and 3 are true at the time at which output 4 goes from true to false.

Applying similar analysis to the remaining equations, we see that the command B OFF is effected when output 2 is false and output 3 is true at the time output 4 goes from true to false. The "A ON" command is issued when output 2 is true and output 3 is false at the time output 4 goes from true to false condition. Finally, the "A OFF" command is effected when both outputs 2 and 3 are in a false condition (no output) at the time output 4 goes to the false condition, having been previously true.

Figures 4, 4A, 4B, 4C, 4D:
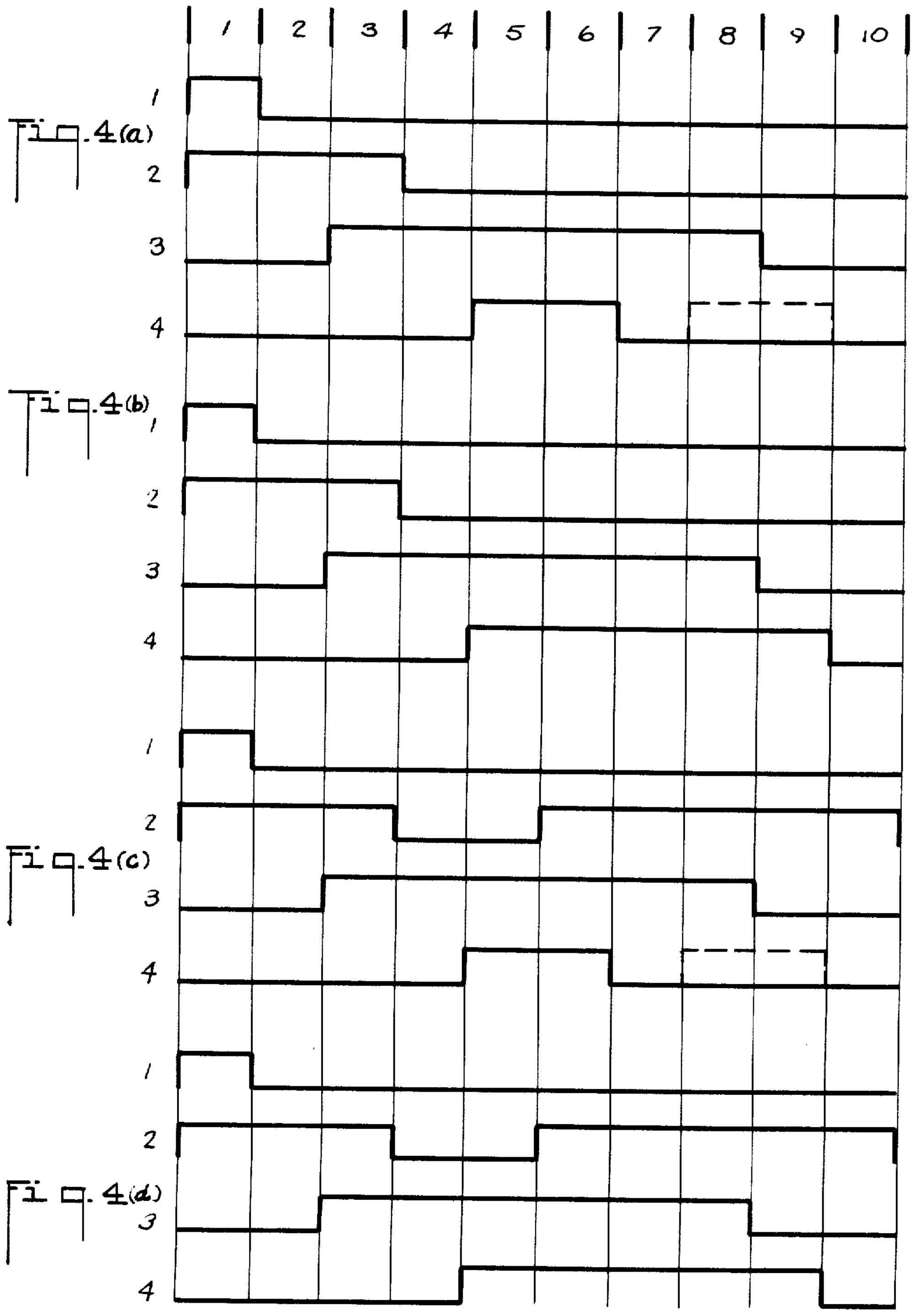
FIGS. 4(*a*)–4(*d*) are graphical timing diagrams showing the timing of the frequency coded address-command signals for controlling the room converter.

In order to illustrate the execution of the commands described in the above equations, refer to FIGS. 4(*a*)–4(*d*). In these figures, the outputs of the various outputs 1, 2, 3 and 4 are plotted against time, time being divided into time segments 1–10, each time segment being approximately 4 milliseconds (ms). It is first noted that each of the timing diagrams in FIGS. 4*a* through 4*d* show that the outputs 1, 2, 3 and 4 become true in a sequential overlapping order. This is necessary, as discussed above, to provide the "address" function of the coded signals. Within this constraint, however, it can be seen that varying configurations of the outputs 2, 3 and 4 can be achieved, and at these varying configurations can be used to code the "command" portion of the coded signal.

FIG. 4*a* illustrates the execution of the "B OFF" command first, followed by the optional execution of the A OFF command. Note that in time segments 5 and 6, output 2 is false, output 3 is true and output 4 is true. This condition persists until the end of time segment 6, at which time, output 4 goes from true to false. At this moment, the command "B OFF" is executed. This is in accord with the equation discussed earlier describing the B OFF command.

Optionally, the A OFF command can also be executed. From the A OFF equation, it is noted that this command is executed when both outputs 2 and 3 are false at the time output 4 goes from true to false. This condition is satisfied at the end of time segment 9 and thus at that point, the A OFF command is executed. (See dotted line in FIG. 4*a*)

By a similar analysis, it can be seen that a timing sequence such as specified in FIG. 4*b* results in the execution of the A OFF command at the end of time segment 9.

By the same analysis, the B ON command is illustrated in FIG. 4*c* as taking place at the end of time segment 6. During time segment 6, it can be seen, outputs 2 and 3 are positive, along with output 4, which goes to false at the end of time segment 6, thus satisfying the B ON equation. It can further be seen from FIG. 4*c* that the A ON command is executed at the end of time segment 9, provided that output 4 assumes the characteristic indicated in the dotted line between time segments 8 and 9.

FIG. 4*d* shows a timing sequence which results in the execution of the A ON command alone, this command taking place at the end of time segment 9.

It is notable that the timing diagrams of FIGS. 4*a* to 4*d* are not intended to be exhaustive but are illustrative only of possible time sequence patterns of signals 1, 2, 3 and 4 which can be used to effectuate commands by satisfaction of the command logic equations. For example, the relative length of time during which the outputs 1, 2, 3 and 4 are true and false, could be shortened or lengthened without departing from the spirit of this invention.

More basically, it should also be noted that different logic circuitry could be substituted for the logic circuitry disclosed in FIG. 6, while remaining within the scope of this invention. Changes in the logic circuitry could be designed such that different equations for the desired commands could be derived, such that the commands could be carried out with timing sequences different from those illustrated in FIGS. 4*a* to 4*d*. Applicant believes that the general concept of employing a sequence of coded tones which function both to address and command is broad enough to encompass other forms of logic which could be derived by those of skill in the art for operating in a similar fashion.

Figure 7:
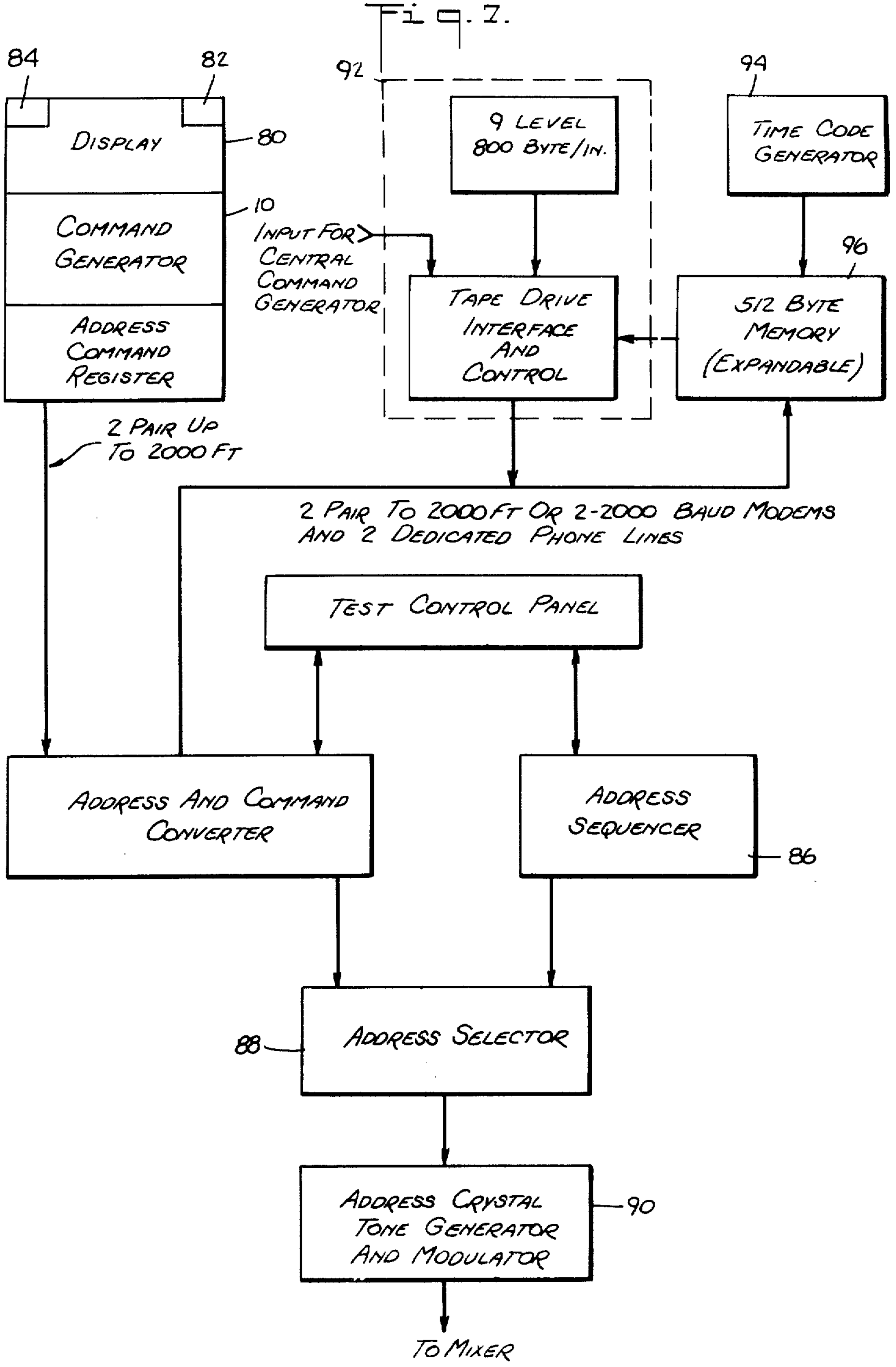
FIG. 7 is a block diagram showing one form of specific control and loging apparatus for the central station of this invention.

Referring to FIG. 7, there is illustrated a particular combination of hardware for use in connection with the command generator 10 at the head end of the subscription television system. In the system of this invention, one form of the subscriber method or ordering the enablement of a given program is by verbal instructions over a telephone to an operator at the central control station, where the command generator is situated.

Each command generator 10 may be provided with a display board 80 which will allow the operator to verify the address and command entry made to the command generator 10 in response to a verbal instruction prior to sending out the command. A "ready" light 82 can be provided to show when the circuits are free to accept a command. Also, a "command accepted" light indicator 84 can be provided to indicate when the command inserted into the command generator has moved to the address and command converter. Address sequencer 86 and address selector 88 serve to actuate the proper gates in a crystal tone generator and modulator 90 to effect the issuance of the address command signal into the cable distribution system by way of mixer 14.

An IBM compatible, nine-track, 800 bit-per-inch tape drive 92 is provided to record all room address commands, and the time of day at which such commands are entered. The tape thus produced can be accepted by any standard IBM compatible computer system for processing, printing out, etc. such as for billing purposes or audience survey.

A timing code generator 94 is also provided. A preferable form of time code generator will resolve 31 days, 24 hours and 4 quarter hours. With this time in the system, as shown, the day, hour and nearest quarter hour time increment which coincides with the time the address command was entered will be recorded.

A 512 byte memory 96 is also included for use with the time code generator and the tape drive. This memory 96 will provide storage for up to 190 address commands and time code words while the tape drive is being operated upon, or the tape being changed. This memory can be provided in any size which is necessary to service the system involved.

As seen from this description, therefore, that means can be provided in a system such as that disclosed herein for providing a permanent record of all address/-command signals which are entered into the system onto the cable distribution system 13. This has a great deal of utility in connection with audience survey work or for accounting purposes.

The systems and techniques of this invention can be employed in a manner in which each individual subscriber station can be interrogated separately to elicit therefrom a response to the central station which is indicative of the secure channel which is being viewed at the subscriber station in question.

Figure 8:
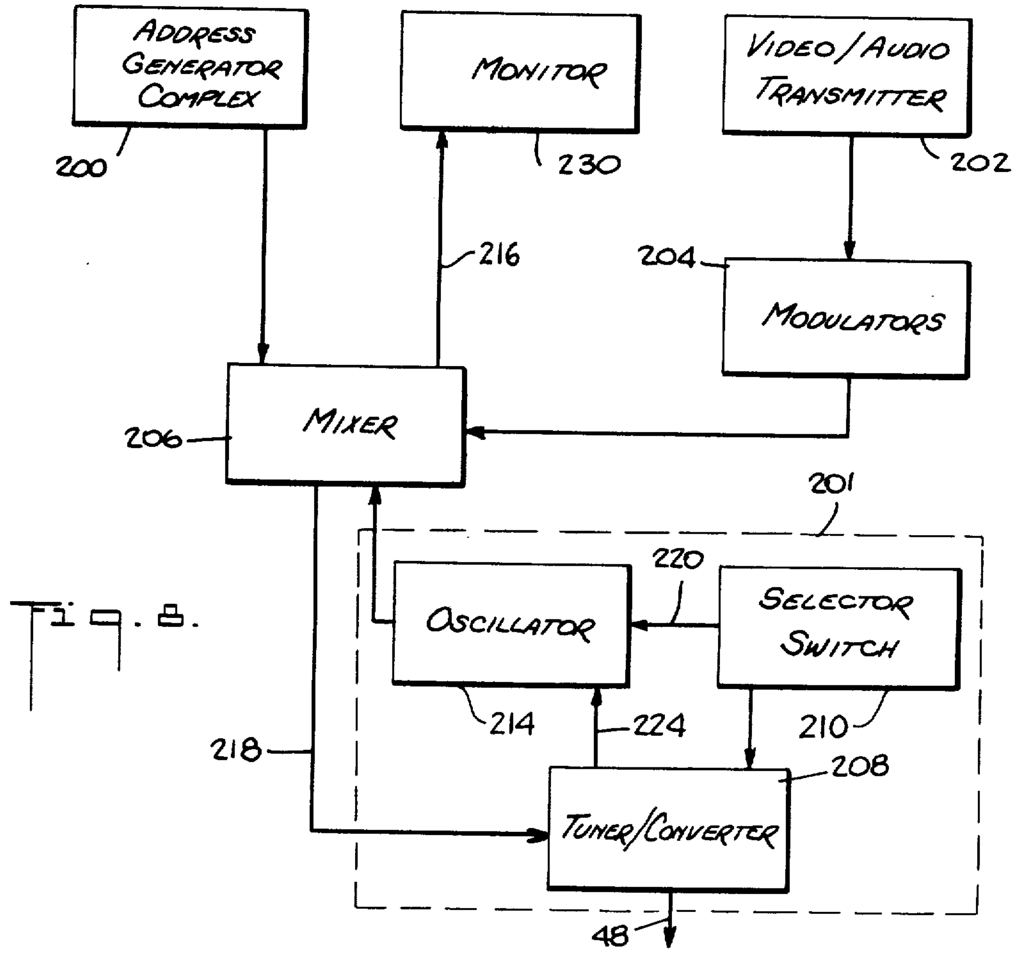
FIG. 8 is a simplified block diagram showing a variant of the present invention applied in a mode permitting interrogation of subscriber stations to elicit a reply signal therefrom.

To illustrate such a system, FIG. 8 is provided, showing a simplified block diagram of the primary components of such an arrangement. In FIG. 8, command address generator complex 200 is provided which contains all the elements necessary to generate and direct to mixer 206 an address sequence of coded tones similar to the coded address signals described previously herein. The secure channel signals are generated by transmitter 202 and modulated by modulators 204 from which they are also inserted into mixer 206.

This combination of signals is then directed via lead 218 to each room converter, a room converter being designated generally here within the dashed box 201. The signal from mixer 206 is inserted into tuner/converter 208. Tuner/converter 208 converts the secure channel signal selected by the setting of selector switch 210 to a channel receivable by a conventional television set and directs the signal to the set via lead 48.

Room converter 201 also includes variable oscillator 214. Variable oscillator 214 emits a signal in response to an address signal generated at complex 200 and directed via lead 218 to the tuner/converter. Tuner/converter 208 possesses tuned circuits similar to those described hereinabove which respond when, and until, a characteristic address signal is furnished on lead 218. The tuned circuits on being actuated on the receipt of their correct address, induce oscillator 214 via line 224 to send the reply signal.

The frequency of the reply signal emanating from oscillator 214 in response to the proper address signal is determined by the setting of selector switch 210, which, of course, also determines that secure channel which is converted and sent to the television set.

In this embodiment, oscillator 214 is not utilized to jam any of the secure channels. Rather, it is used to provide a reply in response to receipt by the room converter of an interrogation signal constituted by its coded address. Since the frequency of the reply signal is dependent upon which secure channel has been selected, it is possible at the central station to monitor the frequency of the reply signals received through line 216, and, by correlating the replies with the addresses, to determine the channels being watched at each of the subscriber stations. This technique is useful, for example, in audience survey work, and for accounting purposes.

Thus, in accordance with this embodiment, the subscriber is allowed to choose whatever channel he wishes to view, all channels being available to him. The status of his receiver at any given time, however, can be recorded at the central station without any action or knowledge on his part.

Preferably, the address complex "scans" or emits every address in the system, repeatedly and with relatively great frequency. This technique provides a constant updating of the status of the viewing at the various subscriber stations.

The above-described application of this invention differs from prior art "answerback" systems, such as that set forth in the Shanahan patent referred to hereinabove. The manner of addressing the various subscriber stations by means of the present invention differs from that of Shanahan. Shanahan applies his coded tones in such a way that each group of four coded tones calls or alerts a different group of four transponder elements. After alerting a group he interrogates the transponders of the group by inhibiting the oscillator which provides the response in a predetermined pattern. The problem with Shanahan is that his system allows for only a relatively small number of unique addresses, far fewer than in applicants' address technique, in which four coded tones can be used to interrogate 5,040 unique addresses.

Moreover, applicants' reply system is superior to that of Shanahan in that each of his subscriber stations respond with a single signal, there being no need to inhibit the oscillator according to a pattern, or provide equipment at the central station to interpret the patterns.

What is claimed is:

1. In a controlled transmission system including a central sending station for sending information on at least two secure channels, a plurality of receiving stations, a transmission path coupling the central sending station with said plurality of receiving stations and wherein receivers at said stations are not capable of directly receiving the secure channels sent, each of said receivers having associated therewith a tuner converter coupled to the central sending station for converting the secured channels sent to a channel receivable by the receiver each tuner converter including a turret tuner switch having a set of contacts to select one or the other of the secured channels for conversion, means for selectively disabling and enabling each of said receivers to receive one or the other of said secure channel signals comprising:

a. means associated with the central sending station for sending in addition to the secure channel signals coded address signals and command signals;
b. means at each receiving station for decoding address and command signals, each decoding means being responsive to a different address code from said central sending station and responsive to at least two separate command signal codes from said sending station;
c. means at said receiving station for providing an interfering signal to said tuner converter;
d. first storage means adapted to be set in response to the reception and decoding of a coded signal addressed to its receiving station and a first command signal;
e. second storage means adapted to be set in response to the reception and decoding of a coded signal addressed to its receiving station and a second command signal; f. an additional set of contacts in said turret tuner having a wiper ganged to the tuner, said wiper coupled to a deactuating input of said interferring means, the additional contact corresponding to the one secured channel being coupled to the output of said first storage means and the additional contact corresponding to said other secured channel being coupled to the output of said second storage means whereby if one of said secured channels is selected that channel can be received only if an appropriate code address and command signal has been received by the receiver causing the associated storage means to be set to disable the interferring means in that receiver when tuned to that secured channel.

2. A control transmission system according to claim 1 wherein said receiver is a television receiver and wherein said central station additionally sends information comprising a standard broadcast channel and further including in said tuner converter, means for selecting between said standard broadcast channel and said secure channels and further means associated therewith for coupling the input from said central station directly to said receiver when said standard broadcast channel is selected and to said tuner converter when said one of said secure channels is selected.

3. A controlled transmission system in accordance with claim 2, in which said transmission path comprises a conductive circuit extending, at least in part, between said sending station and said receiving station.

4. A controlled transmission system in accordance with claim 3, in which said conductive circuit comprises a cable adapted to transmit signals at least in the range of frequencies corresponding to those of television signals.

5. A controlled transmission system in accordance with claim 3, in which said conductive circuit comprises a master antenna system having a master antenna and means for connecting the master antenna to at least one receiving station.

6. A control transmission system in accordance with claim 1 in which the code signals include a predetermined pattern of a plurality of different predetermined frequency pulses and in which said decoding means respond to each of the frequencies of the different frequency pulses.

7. A controlled transmission system in accordance with claim 1 in which the predetermined coded address signal includes a plurality of pulses each having a different discrete frequency, the pulses being transmitted by the central sending station in an overlapping time sequence and in a predetermined order and in which the decoding means comprises, a. means for separating pulses of different discrete frequencies; and b. means connected to the pulse separating means for providing an output whenever all of the pulses of the predetermined coded address signal are separated by the pulse separating means in said predetermined order.

8. A controlled transmission system in accordance with claim 1 in which said means for interfering with the enabling means to prevent reception of the secure channel by the receiver comprises means for producing a signal which can interfere with the receiver receiving the predetermined secure channel.

9. A controlled transmission system in accordance with claim 8 in which the means for producing a signal for interfering with the receiver comprises an oscillator generating a signal related to the characteristic of the predetermined secure channel signal in order to interfere with the receiving of the secure channel signal by the receiver.

10. The improvement in accordance with claim 1 and further comprising means for recording information relating to the transmission of a code to any given receiving station.

* * * * *